3,242,155
OLEFIN POLYMERIZATION CATALYSTS
AND PROCESS
Donald R. Witt, Bartlesville, Okla., assignor to Phillips
Petroleum Company, a corporation of Delaware
No Drawing. Filed July 1, 1960, Ser. No. 40,166
8 Claims. (Cl. 260—94.2)

This invention relates to novel olefin polymerization catalysts and to a process for polymerizing olefins in contact with these catalysts.

An object of the invention is to provide novel catalysts for the polymerization of olefins. Another object is to provide a novel process for the polymerization of olefins. Other objects of the invention will become apparent upon consideration of the accompanying disclosure.

The polymerization of olefins has become increasingly important in view of the wide utility of the polymers which can be formed. This invention is concerned with new polymerization catalysts consisting essentially of compounds of the formula $Al(BR_4)_a R_{3-a}$ wherein R is a member of the group consisting of H and a hydrocarbon radical having 1 to 8 carbon atoms, and ($a$) is an integer of 1 to 3. The hydrocarbon radicals are saturated acyclic, saturated alicyclic, aromatic, and combinations thereof, such as alkyl, cycloalkyl, aryl, alkylcycloalkyl, and the like. Preferably the hydrocarbon radicals contain not more than 6 carbon atoms per radical.

Examples of such compounds are:

| Compound | Hydrocarbon radical |
|---|---|
| $Al(BH_4)_3$ | Hydrocarbon radical. |
| $Al[B(CH_3)_4](BH_4)_2$ | Methyl. |
| $Al[B(C_2H_5)_4]_3$ | Ethyl. |
| $Al[B(C_6H_{13})_4]_3$ | Hexyl. |
| $Al(BH_4)_2[B(C_6H_5)_4]$ | Phenyl. |
| $Al(BH_4)_2[B(C_6H_4C_2H_5)_4]$ | Ethylphenyl. |
| $Al(BH_4)[B(C_6H_5CH_2)_4]_2$ | Phenylmethyl. |
| $Al(BH_4)[B(C_6H_{11})_2H_2]_2$ | Cyclohexyl. |
| $Al(BH_4)_2(C_2H_5)$ | Ethyl. |
| $Al(BH_4)_2(C_8H_{17})$ | Octyl. |
| $Al(BH_4)_2(C_3H_7)$ | Propyl. |
| $Al(BH_4)_1(CH_3)_2$ | Methyl. |

The catalysts of this invention are effective for the polymerization of olefinic compounds, and, particularly, ethylene and 1,3-butadiene. Copolymers of these monomers and copolymers of these monomers with other copolymerizable olefins can also be prepared in the presence of these catalysts. Examples of these comonomers are the $C_3$ to $C_8$ mono-olefins, such as propylene, 1-butene, 1-hexene, 1-octene, isobutylene; diolefins, such as 1,5-hexadiene, 1,4-pentadiene, isoprene, 2,3 - dimethylbutadiene; and similar olefins.

The polymerization according to this invention is best carried out in liquid phase, preferably in the presence of an inert hydrocarbon diluent and, particularly, hydrocarbons of 4 to 12 carbon atoms per molecule which are liquid under the temperature and pressure conditions in the reaction zone. These include n-butane, cyclopentane, methylcyclopentane, benzene, toluene, n-hexane, methylcyclohexane, ethylcyclohexane, n-heptane, n-dodecane, etc. The process can be batchwise or it can be continuous. Frequently, the catalyst is mixed with the diluent, in which case it is convenient to first mix the catalyst in the diluent and pass the resulting solution to the reaction zone where the monomer is separately introduced or the monomer can be pre-dissolved in a separate portion of diluent before passing it to the reaction zone. The polymerization is carried out at a temperature ranging from 0° F., or lower, up to 450° F. A temperature in the range of 150 to 300° F. is generally employed and a temperature in the range of 225 to 300° F. is preferred. The pressure is not critical so long as is sufficient to maintain liquid-phase conditions. An ethylene or butadiene partial pressure of 100 to 500 p.s.i. is preferred.

At the end of the desired reaction period, the catalyst can be inactivated by addition of water or an alcohol, such as methyl or isopropyl alcohol.

The amount of catalyst which is employed in the polymerization process of this invention, whether it is carried out batch-wise, semi-continuous, or continuous, should be sufficient to maintain from 0.01 to 100 millimoles of one of the above-described aluminum borohydrides per mole of monomer present in the polymerization zone. When the polymerization is carried out in the presence of a diluent, the amount of diluent to be maintained in the reaction zone is from 5 to 20 parts by weight per part of monomer present.

The aluminum borohydrides which are employed as catalysts in the process of this invention can be prepared in a variety of ways. $Al(BH_4)_3$ is available commercially, and this material can be alkylated with ethylene, for example, to prepare $Al[B(C_2H_5)_4]_3$. Other alkyl, cycloalkyl and aryl substituted aluminum borohydrides can be prepared in a like manner. Compounds of the type represented by $Al(BH_4)_2(C_2H_5)$ can be prepared, for example, by reaction of lithium borohydride with ethylaluminum dichloride.

The example and runs set forth below illustrate the invention but are not to be construed as unnecessarily limiting the same.

EXAMPLE

For the polymerization runs which are summarized in the Table, aluminum borohydride was employed as the catalyst. The polymerization was effected in a stainless steel reactor having a capacity of about 1400 ml. For each run the reactor was cleaned and flushed with dry nitrogen. The aluminum borohydride catalyst which was contained in a sealed glass ampule was next charged to the reactor. The ampule was broken and 300 grams of cyclohexane was added. After charging the solvent, the monomer was introduced so as to achieve the desired reaction pressure of about 280 p.s.i.g. The weight of ethylene charged initially was approximately 28 grams (1 mole). The reactor was then heated so as to reach a temperature of about 270° F. within a 45-minute period. The reaction temperature was maintained within the limits shown in the attached table. The reaction pressure was maintained by admission of monomer as required. The indicated reaction period includes the time from charging the monomer to the time of termination of the reaction by injection of about 20 ml. of methyl alcohol to destroy the catalyst. The reactor was then vented to remove unreacted monomer. The polymer was recovered by decanting off the supernated liquid. The polymer was then dried in a vacuum oven at 210° F.

Table
OLEFIN POLYMERIZATION WITH ALUMINUM BOROHYDRIDE

| Run No | 1 | 2 |
|---|---|---|
| Olefin | Ethylene | 1,3-butadiene |
| $Al(BH_4)_3$, millimoles | 15 | 16.6 |
| Temperature, °F | 270–300 | 275–290 |
| Pressure, p.s.i.g | 280–450 | 270–390 |
| Hours | 7 | 20.5 |
| Polymer, grams | 6 | 33.3 |
| Type of polymer | White solid | Grease |

The above data show that aluminum borohydride is an effective catalyst for the polymerization of ethylene and 1,3-butadiene. Ethylene is polymerized to a white solid which is useful for the fabrication of filaments, films, and molded articles. The grease prepared from butadiene can be utilized as a nonstaining lubricant and as a plasticizer.

Certain modifications of the invention will become apparent to those skilled in the art and the illustrative details disclosed are not to be construed as imposing unnecessary limitations on the invention.

I claim:

1. A process for polymerizing ethylene which comprises contacting same in admixture with a liquid hydrocarbon diluent inert in the process and a catalyst consisting essentially of an aluminum borohydride having the formula $Al(BR_4)_a R_{3-a}$ wherein R is a member of the group consisting of H and a hydrocarbon radical of 1 to 8 carbon atoms and $(a)$ is an integer of 1 to 3, under polymerizing conditions including a temperature in the range of 0 to 450° F., a pressure in the range of 100 to 500 p.s.i. and sufficient to maintain a substantial proportion of the ethylene in liquid phase, and a mol ratio of ethylene to catalyst in the range of 10:1 to 100,000:1 so as to form solid polyethylene and recovering the resulting polymer.

2. The process of claim 1 wherein said catalyst is $Al(BH_4)_3$.

3. The process of claim 1 wherein said diluent is cyclohexane.

4. The process of claim 1 wherein said diluent is isooctane.

5. A process for polymerizing an olefin feed of one of the group consisting of ethylene and 1,3-butadiene and mixtures of one of said group with a $C_3$ to $C_8$ monoolefin which comprises contacting said olefin feed in a reaction zone with a catalyst consisting essentially of an aluminum borohydride having the formula $Al(BR_4)_a R_{3-a}$ wherein R is a member of the group consisting of H and a hydrocarbon radical of 1 to 8 carbon atoms and $(a)$ is an integer of 1 to 3, under polymerizing conditions including a temperature in the range of 0 to 450° F., a pressure in the range of 100 to 500 p.s.i. and sufficient to maintain a substantial proportion of said olefin in liquid phase in admixture with said catalyst, and a mole ratio of olefin to catalyst in the range of 10:1 to 100,000:1, so as to polymerize said olefin to solid polymer, and recovering the resulting polymer from said reaction zone.

6. The process of claim 5 using as said olefin, 1,3-butadiene, a temperature in the range of 150 to 300° F., and a pressure in the range of 100 to 500 p.s.i.

7. The process of claim 6 using cyclohexane as said diluent.

8. The process of claim 6 using isooctane as said diluent.

References Cited by the Examiner

UNITED STATES PATENTS

| | | | |
|---|---|---|---|
| 2,685,575 | 8/1954 | Heiligman et al. | 260—94.9 |
| 2,699,457 | 1/1955 | Zeigler | 260—94.9 |
| 2,725,374 | 11/1955 | Mosher | 260—94.9 |
| 2,832,759 | 4/1958 | Nowlin et al. | 260—94.9 |
| 2,840,551 | 6/1958 | Field | 260—94.9 |
| 2,925,441 | 2/1960 | Brown | 260—448 |

OTHER REFERENCES

Brokaw et al.: Journal of the American Chemical Society 72, 3237 (1950).

Chem. Abs., vol. 51, 1957, page 3211 (article by Schrauzer).

JOSEPH L. SCHOFER, *Primary Examiner.*

LESLIE H. GASTON, MARK LIEBMAN, JOSEPH R. LIBERMAN, LEON J. BERCOVITZ, *Examiners.*